United States Statutory Invention Registration [19]

[11] Reg. Number: H786

Adolph et al. [43] Published: Jun. 5, 1990

[54] COPOLYFORMALS OF 1,2-BIS(2-HYDROXYETHYL)-1,2-DICARBADODECABORANE AND POLYNITROALKYL DIOLS

[75] Inventors: Horst G. Adolph, Burtonsville; Lori A. Nock, Baltimore, both of Md.

[73] Assignee: The United States of America as represented by the Secretary of the Navy, Washington, D.C.

[21] Appl. No.: 389,239

[22] Filed: Aug. 2, 1989

[51] Int. Cl.[5] ..... C08G 4/00

[52] U.S. Cl. ..... 528/4

[56] References Cited

U.S. PATENT DOCUMENTS 3,158,656 11/1964 Alexander et al. ..... 568/5

*Primary Examiner*—John S. Maples
*Assistant Examiner*—Chhaya Sayala
*Attorney, Agent, or Firm*—Kenneth E. Walden; Roger D. Johnson

[57] ABSTRACT

Dihydroxy-terminated copolyformals formed from

A. formaldehyde and

B. a diol comonomer mixture of (1) 1,2-bis(2-hydroxyethyl)-1,2-dicarbadodecaborane(12) and (2) a nitrodiol which is $HOCH_2CH_2N(NO_2)CH_2CH_2OH$, $HOCH_2CH_2N(NO_2)CH_2C(NO_2)_2CH_2CH_2OH$, $HOCH_2CH_2N(NO_2)CH_2CH_2N(NO_2)CH_2CH_2OH$, $HOCH_2C(NO_2)_2CH_2OCH_2OCH_2C(NO_2)_2CH_2OH$, $HOCH_2CH_2N(NO_2)CH_2C(NO_2)_2CH_2N(NO_2)CH_2CH_2OH$, $HOCH_2CH_2C(NO_2)_2CH_2N(NO_2)CH_2C(NO_2)_2CH_2CH_2OH$, $HOCH_2CH_2CH_2C(NO_2)_2CH_2OCH_2OCH_2C(NO_2)_2CH_2CH_2CH_2OH$, $HOCH_2CH_2N(NO_2)CH_2C(NO_2)_2CH_2OCH_2OCH_2C(NO_2)_2CH_2N(NO_2)CH_2CH_2OH$, or mixtures thereof. A fraction of the nitrodiol may be replaced with an equal number of moles of a fluorodiol which is $HOCH_2CF_2CF_2CF_2CH_2OH$, $HOCH_2CF_2CF_2CF_2CF_2CH_2OH$, $HOCH_2CF(CF_3)OCF_2CF_2CF_2CH_2OH$, or mixtures thereof.

19 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COPOLYFORMALS OF 1,2-BIS(2-HYDROXYETHYL)-1,2-DICARBADODECABORANE AND POLYNITROALKYL DIOLS

BACKGROUND OF THE INVENTION

This invention relates to copolyformals and more particularly to copolyformals containing carborane and polynitroalkyl groups.

Previously, carborane based burning rate modifiers have been incorporated in propellant compositions as separate species, physically dissolved in the binder. This has permitted crystallization and migration of the burning rate modifier within the propellant composition and across interfaces with adjoining materials, resulting in nonuniform distribution of the carborane compound within the propellant compositions.

U.S. Pat. No. 3,258,479 discloses the polymerization of 1,2-bis(2-hydroxyethyl)-1,2-dicarbadodecaborane(12), $B_{10}H_{10}[C(CH_2CH_2OH)]_2$, with either (a) 1,2-bis(carboxymethyl)-1,2-dicarbadodecaborane(12), $B_{10}H_{10}[C(CH_2COOH]_2$, or (b) the corresponding acid chloride $B_{10}H_{10}[C(CH_2COCl)]_2$ to form a polyester which is useful in solid rocket propellants. U.S. Pat. No. 3,311,593 discloses the reaction of 1,2-bis(hydroxyethyl)-1,2-dicarbadodecaborane(12) diisocyanate of the formula $B_{10}H_{10}[C(N{=}C{=}O)]_2$ to produce a polyurethane which is useful in solid rocket propellants. Because of their physical properties these polymers are not suitable as binders for many solid propellant applications. Moreover, the dicarborane content of these polymers is fixed and can not be tailored to a variety of applications.

It would be desirable in polynitroalkyl propellant binders to tie down the carborane based burning rate modifiers in a uniform distribution and thus achieve a more uniform burning propellant. It would also be desirable to vary the carborane content of propellant binders in controlled amounts.

SUMMARY OF THE INVENTION

Accordingly, an object of this invention is to provide new polymeric binders for propellants.

Another object of this invention is to provide polyfluoroalkyl diol prepolymers with carborane groups bonded to the backbone of the prepolymers.

A further object of this invention is to provide propellant compositions with carborane groups which will not migrate or crystallize out.

Yet another object of this invention is to provide means for tailoring the burning rates of propellant composites by varying the carborane content and distribution in a uniform, predictable manner.

These and other objectives of this invention are accomplished by providing a dihydroxy-terminated copolyformal prepolymer formed from A. formaldehyde and B. a diol comonomer mixture of (1) 1,2-bis(2-hydroxyethyl)-1,2-dicarbadodecaborane(12) and (2) a nitrodiol which is $HOCH_2CH_2N(NO_2)CH_2CH_2OH$, $HOCH_2CH_2N(NO_2)CH_2C(NO_2)_2CH_2CH_2OH$ $HOCH_2CH_2N(NO_2)CH_2CH_2N(NO_2)CH_2CH_2OH$, $HOCH_2C(NO_2)_2CH_2OCH_2OCH_2C(NO_2)_2CH_2OH$ $HOCH_2CH_2C(NO_2)_2CH_2N(NO_2)CH_2C(NO_2)_2CH_2CH_2OH$, $HOCH_2CH_2CH_2C(NO_2)_2CH_2OCH_2OCH_2C(NO_2)_2CH_2CH_2CH_2OH$, $HOCH_2CH_2N(NO_2)CH_2C(NO_2CH_2OCH_2OCH_2C(NO_2)_2CH_2N(NO_2)CH_2CH_2OH$, or mixtures thereof, wherein 1,2-bis(2-hydroxyethyl)-1,2-dicarbadodecaborane(12) comprises from more than zero to less than 50 mole percent of the diol comonomer mixture with the nitrodiol being the remainder, and wherein the terminal functional groups of the copolyformal are hydroxy groups.

DETAILED DESCRIPTION OF THE PREFERRED EMBODIMENT

The polymers of the present invention are prepared by the polycondensation of 1,2-bis(2-hydroxyethyl)-1,2-dicarbadodecaborane(12) and a nitrodiol with formaldehyde in sulfolane with a boron trifluoride etherate catalyst. The resulting carborane and nitro monomeric units will be distributed more or less randomly in the polymeric chain with formal (—$OCH_2O$—) linkages between monomeric units. Due to the absence of side reactions in the propagation and termination steps of the polymerization reaction, the copolyformals described here are nearly 100 percent difunctional and exclusively terminated by hydroxy groups. This characteristic is useful because it results in reproducible curing in cast-curable compositions, and because it permits the synthesis of well-defined block copolymers. The carborane units are fairly uniformly distributed in selected concentrations and are bonded to the backbone of the copolyformal and thus will not migrate.

The carborane containing monomer used in the copolyformals of this invention is 1,2-bis(2-hydroxyethyl)-1,2-dicarbadodecaborane(12) which is also called 1,2-diethanol-1,2-dicarbadodecaborane(12) and which has the chemical abstracts identification number 23810-37-9.

R. P. Alexander et al in U.S. Pat. No. 3,158,656 entitled "Organoboron Alcohols and their Preparation," disclose methods of preparing this alcohol, herein incorporated by reference. The patent also discloses the 3 dimensional structure of the dicarbadodecaborane alcohol. In this specification the shortened formulas $B_{10}H_{10}[C(CH_2CH_2OH)]_2$ or

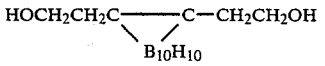

will be used to designate 1,2-bis(2-hydroxyethyl)-1,2-dicarbadodecaborane(12).

The dihydroxy-terminated nitrodiols which may be used in the diol comonomer mixture include (1) 3-nitro-3-azapentane-1,5-diol, $HOCH_2CH_2N(NO_2)CH_2CH_2OH$;

(2) 3,5,5-trinitro-3-azaheptane-1,7-diol, $HOCH_2CH_2N(NO_2)CH_2C(NO_2)_2CH_2CH_2OH$;

(3) 3,6-dinitro-3,6-diazaoctane-1,8-diol, $HOCH_2CH_2N(NO_2)CH_2CH_2N(NO_2)CH_2CH_2OH$;

(4) 2,2,8,8-tetranitro-4,6-dioxanonane-1,9-diol, $HOCH_2C(NO_2)_2CH_2OCH_2OCH_2C(NO_2)_2CH_2OH$;

(5) 3,5,5,7-tetranitro-3,7-diazanonane-1,9-diol, $HOCH_2CH_2N(NO_2)CH_2C(NO_2)_2CH_2N(NO_2)CH_2CH_2OH$;

(6) 3,3,5,7,7-pentanitro-5-azanonane-1,9-diol, $HOCH_2CH_2C(NO_2)_2CH_2N(NO_2)CH_2C(NO_2)_2CH_2CH_2OH$;

(7) 4,4,10,10-tetranitro-6,8-dioxatridecane-1,13-diol, $HOCH_2CH_2CH_2C(NO_2)_2CH_2OCH_2OCH_2C(NO_2)_2CH_2CH_2CH_2OH$;

(8) 3,5,5,11,11,13-hexanitro-3,13-diaza-7,9-dioxapentadecane-1,15-diol, $HOCH_2CH_2N(NO_2)CH_2C(NO_2)_2CH_2OCH_2OCH_2C(NO_2)_2CH_2N(NO_2)CH_2CH_2OH$; or mixtures thereof.

Preferred among these nitrodiols are $HOCH_2CH_2N(NO_2)CH_2CH_2N(NO_2)CH_2CH_2OH$, $HOCH_2CH_2N(NO_2)CH_2C(NO_2)_2CH_2N(NO_2)CH_2CH_2OH$, $HOCH_2C(NO_2)_2CH_2OCH_2OCH_2C(NO_2)_2CH_2OH$, and $HOCH_2CH_2N(NO_2)CH_2C(NO_2)_2CH_2OCH_2OCH_2C(NO_2)_2CH_2N(NO_2)CH_2CH_2OH$.

1,2-bis(2-hydroxyethyl)-1,2-dicarbadodecaborane(12) comprises from more than zero to less than 50, preferably from more than zero to 30, more preferably from more than zero to 20, and still more preferably from more than zero to 10 mole percent of the diol comonomer mixture, with the nitrodiol comprising the remainder. Again, the monomeric units produced from these diols will be more or less randomly distributed in the copolyformal chain with formal (—$OCH_2O$—) links between diol monomeric units. The copolyformal is treated to convert terminal hemiformal (—$CH_2OCH_2OH$) groups into terminal hydroxy groups —$CH_2OH$. This can be done with $H_2O_2$ as in the examples. This treatment improves the stability of the end groups and the stability of the polymers.

The copolyformals of this invention can be modified by replacing from more than zero to less than 50, and preferably from 10 to 30 percent of the nitrodiol with an equal number of moles of a fluorodiol which is:

(1) 2,2,3,3,4,4-hexafluoropentane-1,5-diol, $HOCH_2CF_2CF_2CF_2CH_2OH$;

(2) 2,2,3,3,4,4,5,5-octafluorohexane-1,6-diol, $HOCH_2CF_2CF_2CF_2CF_2CH_2OH$;

(3) 2,4,4,5,5,6,6-heptafluoro-2-trifluoromethyl-3-oxaheptane-1,7-diol, $HOCH_2CF(CF_3)OCF_2CF_2CF_2CH_2OH$; or mixtures thereof. The substitution of the fluorodiol lowers the glass transition temperature ($T_G$) of the copolyformal.

Examples 1 through 3 illustrate the conditions for preparing the copolyformals of this invention. The polycondensation of mixtures of the 1,2-bis(2-hydroxyethyl)-1,2-dicarbadodecaborane( 12) and nitrodiol with formaldehyde is accomplished at room temperature in sulfolane with a boron trifluoride etherate catalyst The boron trifluoride etherate is added slowly to a mixture of the nitrodiols, formaldehyde, and sulfolane to prevent overheating. After completion of the reaction, the copolyformal is isolated as described in the examples The same procedure is used when a minor fraction of the nitrodiol is replace with a fluorodiol as discussed above.

The copolyformals of this invention preferably have a number average molecular weight of from about 1000 to about 4000 and more preferably from 2000 to 3000. The average molecular weight may be adjusted by varying the stoichiometry (ratio of formaldehyde to diols) and reaction conditions (amount of $BF_3$ etherate and solvent, temperature).

The general nature of the invention having been set forth, the following examples are presented as specific illustrations thereof It will be understood that this invention is not limited to these specific examples but is susceptible to various modifications that will be recognized by one of ordinary skill in the art.

EXAMPLE 1

Poly(3,5,5,11,11,13-hexanitro-3,13-diaza-7,9-dioxapentadecane-1,15-diol formal-co-1,2-bis(2-hydroxyethyl)-1,2-dicarbadodecaborane(12) formal); 90:10

Under a nitrogen blanket, 2.74 g (5.27 mmol) of 3,5,5,11,11,13-hexanitro-3,13-diaza-7,9-dioxapentadecane-1,15-diol and 0.140 g of 1,2-bis(2-hydroxyethyl)-1,2-dicarbadodecaborane(12) were dissolved in 3 mL of dry sulfolane (4A molecular sieves) with warming. After cooling to room temperature, 0.16 g of trioxane (formaldehyde) was added followed by dropwise addition of 0.6 mL of $BF_3$ etherate. After stirring 15 hours at 20° C., 15 mL of dichloromethane was added and the solution was stirred with 20 mL of water and 0.5 mL of 30% $H_2O_2$ for 3 hours. The organic phase was separated and stirred with 20 mL 1% aqueous KOH+0.25 mL 30% $H_2O_2$. After phase separation, the dichloromethane was evaporated and the remaining polymer was triturated with 25 mL portions of water at 35°–40° C. (adding a few mL of dichloromethane to permit stirring, if necessary) until no sulfolane was detected by NMR (proton spectrum, Varian 390 90 MHz instrument). The polymer was finally redissolved in dichloromethane, the solution stirred with a small amount of silica gel (Kieselgel 60) overnight, filtered, and evaporated to give 2.2 g (approx. 80%) of a yellowish, hard glass. The polymer had $\overline{M}_N=2160$.

EXAMPLE 2

The procedure of example 1 was repeated using a 80:20 molar ratio of 3,5,5,11,11,13-hexanitro-3,13-diaza-7,9-dioxapentadecane-1,15-diol to 1,2-bis(2-hydroxyethyl)-1,2-dicarbadodecaborane(12). The yield was approximately 80%, the $\overline{M}_N$ was 2115.

EXAMPLE 3

The procedure of example 1 was repeated using a 70:30 molar ratio of 3,5,5,11,11,13-hexanitro-3,13-diaza-7,9-dioxapentadecane-1,15-diol to 1,2-bis(2-hydroxyethyl)-1,2-dicarbadodecaborane(12). The yield was approximately 80%, the $\overline{M}_N$ was 1748 and the glass transition temperature ($T_G$) was 5° C.

Obviously, numerous modifications and variations of the present invention are possible in light of the above teachings. It is therefore to be understood that within the scope of the appended claims the invention may be practiced otherwise than as specifically described herein.

We claim:

1. A dihydroxy-terminated copolyformal formed from

A. formaldehyde and

B. a diol comonomer mixture of (1) 1,2-bis(2-hydroxyethyl)-1,2-dicarbadodecaborane(12) and (2) a nitrodiol selected from the group consisting of $HOCH_2CH_2N(NO_2)CH_2CH_2OH$, $HOCH_2CH_2N(NO_2)CH_2C(NO_2)_2CH_2CH_2OH$ $HOCH_2CH_2N(NO_2)CH_2CH_2N(NO_2)CH_2CH_2OH$, $HOCH_2C(NO_2)_2CH_2OCH_2OCH_2C(NO_2)_2CH_2OH$, $HOCH_2CH_2N(NO_2)CH_2C(NO_2)_2CH_2N(NO_2)CH_2CH_2OH$, $HOCH_2CH_2C(NO_2)_2CH_2N(NO_2)CH_2C(NO_2)_2CH_2CH_2OH$, $HOCH_2CH_2CH_2C(NO_2)_2CH_2OCH_2OCH_2C(NO_2)_2CH_2CH_2OH$, $HOCH_2CH_2N(NO_2)CH_2C$-

$(NO_2)_2CH_2OCH_2OCH_2C(NO_2)_2CH_2N$-$(NO_2)_2CH_2CH_2OH$, and mixture thereof, wherein 1,2-bis(2-hydroxyethyl)-1,2-dicarbadodecaborane(12) comprises from more than zero to less than 50 mole percent of the diol comonomer mixture with the nitrodiol being the remainder, and wherein the terminal functional groups of the copolyformal are hydroxy groups.

2. The copolyformal of claim 1 wherein 1,2-bis(2-hydroxyethyl)-1,2-dicarbadodecaborane(12) comprises from more than zero to 30 mole percent of the diol comonomer mixture with the nitrodiol being the remainder.

3. The copolyformal of claim 2 wherein 1,2-bis(2-hydroxyethyl)-1,2-dicarbadodecaborane(12) comprises from 1 to 20 mole percent of the diol comonomer mixture with the nitrodiol being the remainder.

4. The copolyformal of claim 2 wherein 1,2-bis(2-hydroxyethyl)-1,2-dicarbadodecaborane(12) comprises from 5 to 10 mole percent of the diol comonomer mixture with the nitrodiol being the remainder.

5. The copolyformal of claim 1 wherein the nitrodiol is $HOCH_2CH_2N(NO_2)CH_2CH_2OH$.

6. The copolyformal of claim 1 wherein the nitrodiol is $HOCH_2CH_2N(NO_2)CH_2C(NO_2)_2CH_2CH_2OH$.

7. The copolyformal of claim 1 wherein the nitrodiol is $HOCH_2CH_2N(NO_2)CH_2CH_2N(NO_2)_2CH_2CH_2OH$.

8. The copolyformal of claim 1 wherein the nitrodiol is $HOCH_2C(NO_2)_2CH_2OCH_2OCH_2C(NO_2)_2CH_2OH$.

9. The copolyformal of claim 1 wherein the nitrodiol is $HOCH_2CH_2N(NO_2)CH_2C(NO_2)_2CH_2N$-$(NO_2)CH_2CH_2OH$.

10. The copolyformal of claim 1 wherein the nitrodiol is $HOCH_2CH_2N(NO_2)_2CH_2N(NO_2)CH_2C$-$(NO_2)_2CH_2CH_2OH$.

11. The copolyformal of claim 1 wherein the nitrodiol is $HOCH_2CH_2C(NO_2)_2CH_2OCH_2OCH_2C$-$(NO_2)_2CH_2CH_2CH_2OH$.

12. The copolyformal of claim 1 wherein the nitrodiol is $HOCH_2CH_2N(NO_2)CH_2C(NO_2)_2CH_2OCH$-$_2OCH_2C(NO_2)_2CH_2N(NO_2)CH_2CH_2OH$.

13. The copolyformal of claim 1 wherein the number average molecular weight of the copolyformal is from about 1000 to about 4000.

14. The copolyformal of claim 1 wherein the number average molecular weight of the copolyformal is from 2000 to about 3000.

15. The copolyformal of claim 1 wherein from more than zero to less than 50 percent of the nitrodiol is replaced with an equal number of moles of a fluorodiol selected from the group consisting of $HOCH_2CF_2CF_2CF_2CH_2OH$, $HOCH_2CF_2CF_2CF_2CF_2CH_2OH$, $HOCH_2CF(CF$-$_3)OCF_2CF_2CF_2CH_2OH$, and mixtures thereof.

16. The copolyformal of claim 15 wherein from 10 to 30 percent of the nitrodiol is replaced with an equal number of moles of the fluorodiol.

17. The copolyformal of claim 15 wherein the fluorodiol is $HOCH_2CF_2CF_2CF_2CH_2OH$.

18. The copolyformal of claim 15 wherein the fluorodiol is $HOCH_2CF_2CF_2CF_2CF_2CH_2OH$.

19. The copolyformal of claim 15 wherein the fluorodiol is $HOCH_2CF(CF_3)OCF_2CF_2CF_2CH_2OH$.

* * * * *